United States Patent [19]

Burkey

[11] Patent Number: 4,817,452

[45] Date of Patent: Apr. 4, 1989

[54] FORCE AND THROW TRANSFORMER FOR ACTUATION LINKAGES

[76] Inventor: Ronald L. Burkey, 32550 Bradley, Sun City, Calif. 92381

[21] Appl. No.: 218,467

[22] Filed: Jul. 13, 1988

Related U.S. Application Data

[63] Continuation-in-part of Ser. No. 24,474, Mar. 11, 1987, abandoned.

[51] Int. Cl.⁴ ............................................. G05G 7/04
[52] U.S. Cl. ...................................... 74/522; 74/489; 74/502.2; 188/2 D; 192/99 S
[58] Field of Search ................. 74/489, 516, 517, 518, 74/501 R, 501 A, 501 B, 522, 525, 502.2; 188/2 D; 192/99 S

[56] References Cited

U.S. PATENT DOCUMENTS

| | | | |
|---|---|---|---|
| 273,276 | 3/1883 | Hawkinson | 74/522 |
| 1,255,220 | 2/1918 | Petry | 74/522 X |
| 2,480,083 | 8/1949 | McMillan | 74/501 A X |
| 2,796,774 | 6/1957 | Peed, Jr. | 74/522 |
| 4,149,432 | 4/1979 | Lostahaude | 74/489 |
| 4,301,694 | 11/1981 | Costa | 74/518 |
| 4,637,485 | 1/1987 | Otteson | 74/522 X |

Primary Examiner—Allan D. Herrmann

[57] ABSTRACT

The invention provides a simple method for reducing the amount of force required to actuate a motorcycle clutch. A miniature, lightweight housing means provides a pivot for a lever means to which is attached a short cable from the clutch actuation handle and also the original cable from the clutch. Because the two cable attachment points on the lever means are staggered, the lever means provides mechanical advantage and thereby reduces the manual force required to move the clutch actuation handle.

The invention is designed to allow fast installation by providing cable slots in all parts and using cable sleeve tension to permit simple hook-on attachment of cable terminal hardware to the lever means. The housing means cover is used to exclude the environment and also to assure mechanical strength. The pivot pin and attachment hardware for anchoring the cables is locked into place by the covers.

4 Claims, 1 Drawing Sheet

FORCE AND THROW TRANSFORMER FOR ACTUATION LINKAGES

This is a continuation-in-part of application Ser. No. 024,474, filed on Mar. 11, 1987 now abandoned.

BACKGROUND

1. Field of the Invention

The invention relates to force transmission through a mechanical linkage, especially a cable system which provides remote actuation of brake or clutch devices used on lightweight vehicles.

2. Description of Prior Art

Many lightweight vehicles such as motorcycles, bicycles, wheelchairs, aircraft, lawn mowers, etc. incorporate manually actuated mechanical linkages for clutches, brakes, gear changers and other devices. Manual actuation is usually achieved by hand grip control lever means or foot lever meanss. The actuation force available through manual effort is limited to the capacity of human strength. An average adult male can exert approximately 45 pounds of force on a one hand grip lever means with a throw (actuation distance) of about four inches.

The actuating mechanism; hand lever means, foot pedal, etc. is designed to enable the user to exert enough force to overcome a return spring, cable and pulley friction and the resistance of the actuated device. The total force required is often greater than human capacity so that mechanical advantage is usually designed into the actuating mechanism and/or the actuated device. The cable linkage actuating control lever means is a good example of a prior art application of mechanical advantage. U.S. Pat. No. 4,149,432, titled "Cycle Handlebar Lever For Brake Or Clutch Control", issued Apr. 17, 1979 to inventor Mark A. Costahaude, teaches a means for achieving mechanical advantage in order to reduce the manual force required to actuate a linkage system. U.S. Pat. No. 4,301,694, titled "Hand Operated Lever Linkage Control", issued Nov. 24, 1981 to inventor Larry J. Costa, shows a method for mechanical advantage with adjustable means mounted on a control lever.

Cables are most often used in conjunction with mechanical linkages to transmit actuation forces over short distances. Actuation cables of this type usually side within a tight fitting, flexible, steel sleeve which need only be anchored at its end points. Other cable systems use free cables routed over pulleys in order to change direction, achieve mechanical advantage, etc. Other linkage systems use link bars or chains of various construction to achieve greater strength and flexibility.

During the useful life of a mechanical linkage assembly, lubricants dry out, mechanical parts wear and the metal work hardening occurs in springs. The manual effort required for actuation tends to increase with the age of the linkage system. The operation of standard linkage systems by the very young, the very old, the infirm or others whose capabilities lie outside the range of strength for which a system is designed, presents a problem for which no simple prior art solution exists. No prior art device has been found which may be easily installed into existing linkage assemblies, without modifying them, which will reduce the manual force required for actuation. No prior art device has been found which is specifically designed to be retrofitted into an existing cable actuation system.

OBJECTS AND ADVANTAGES

The objects and advantages of the invention include its ability to increase or alternately reduce the force and the throw distance required to actuate a mechanical linkage assembly, said device having a means to adjust the force and throw distance required for such actuation, and which is simply and easily installed into an existing mechanical linkage assembly without altering or modifying the linkage assembly in any way, and said device being small and light enough so as to fit into a wide range of existing mechanical linkage assemblies. The unique combination of elements of the invention make it a valuable tool.

Although the invention has a very broad range of usefulness, with applications for both increasing as well as reducing actuation force requirements and also in increasing as well as decreasing linkage throw distances, the preferred embodiment uses the force reduction aspect of the device. As applied to hand operated lever means control linkage systems on light vehicles, a reduction of manual force is often required by children, the aged, the infirm, and in some cases by small or weak adults. In cases such as a motorcycle used in motorcross racing, the operator uses the clutch constantly over extended periods of time so that a significant force reduction is necessary in order to stay within human muscle endurance limits. Many traditional devices and equipments were designed for the strength of a strong adult male. Today women often use these controls and require a force reduction to place the strength requirement within their range.

In older devices and mechanisms the actuation force required for normal operation has increased during years of use due to weakening of components, hardening of lubricants etc. The invention can improve operational performance without requiring an increase in manual effort.

The preferred embodiment of the invention is specifically designed to mount in the clutch actuation cable assembly of a motorcycle and means is provided for quick and easy installation onto any standard motorcycle. Once mounted the invention provides the advantage of lessening the manual force required to squeeze the hand lever means which disengages the clutch. As described and shown herein, the preferred embodiment provides a choice of three mechanical advantage ratios. A simple means is provided for changing the selected ratio quickly and easily without tools other than a screwdriver to remove and replace the invention's cover. The invention is not anchored or bolted down in any way other than being installed into the cable drive train. In this regard, the lightness and small size of the invention are important. Installation requires no modification whatsoever to the invention or to the existing linkage system which the invention becomes a functioning part of.

Further objects and advantages of the invention will become apparent from a consideration of the drawings and ensuing description.

DRAWING REFERENCE NUMERALS

Figure 1:
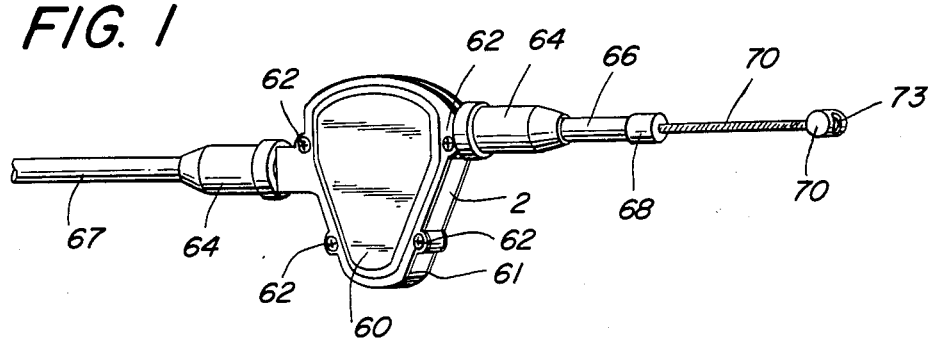
FIG. 1 shows the invention with input cable at upper right and output cable on the left.

2: Housing means
4: Tapped through hole
5: Boss
6: Cable entry slot for output cable
7: Threaded hole
8: Support for pivot pin
10: Pivot pin aperture in housing means
12: Cable entry slot for input cable
20: Lever means
22: Pivot pin aperture in lever means
24: Cable entry slot
26: Anchoring means
30: Undercut
40: Lock nut
42: Cable adjuster
44: Cable adjuster threaded end
46: Pivot pin means
48: Slot in cable adjuster
60: Front cover
61: Back cover
62: Machine screw
64: Rubber boot
66: Cable sleeve for input cable
67: Cable sleeve for output cable
68: Sleeve terminal
70: Input cable
71: Output cable
72: Cable terminal
73: Cable end piece.

DESCRIPTION OF THE INVENTION

FIGS. 1 through 4 show the invention according to the preferred embodiment.

Figure 3:
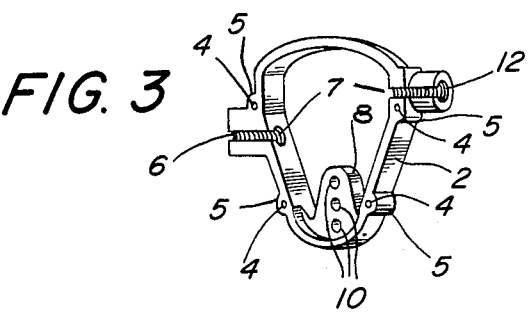
FIG. 3 shows housing means 2 with both front and rear covers 60, 61 removed.

Referring first to FIG. 3; the invention consists of housing means 2 having a boss 5 located at four places, each boss containing a tapped through hole 4. On the upper right side of housing means 2, cable entry slot for input cable 12 and threaded hole 7 is located. On the center of the left side of housing means 2, cable entry slot for output cable 6 and a second threaded entry hole 7 is located. In the interior of housing means 2, located at bottom center, support for pivot pin 8 which contains pivot pin aperture in housing means 10 is located.

Figure 4:
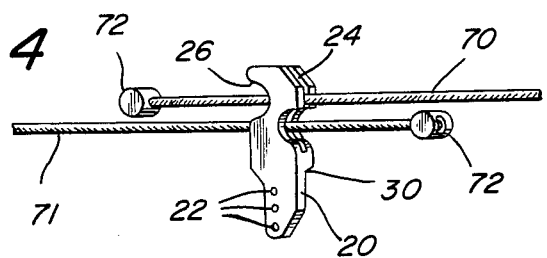
FIG. 4 shows lever means 20 and illustrates the method by which the input and output cables 70, 71 are installed.

Referring to FIG. 4; lever means 20 contains undercut 30 which reduces the thickness of lever means 20 over the bottom one-third of its length. Pivot pin aperture in lever means 22, spaced to match pivot pin pivot pin aperture in housing means 10 are located along the center line of lever means 20. The upper half of lever means 20 contains cable entry slot 24 which is wide enough to allow passage of cables 70 and 71. Two semi-circular shaped cutouts form anchoring means 26 on the left and right sides of lever means 20 and are wide enough to loosely cradle cable terminals 72.

Figure 2:
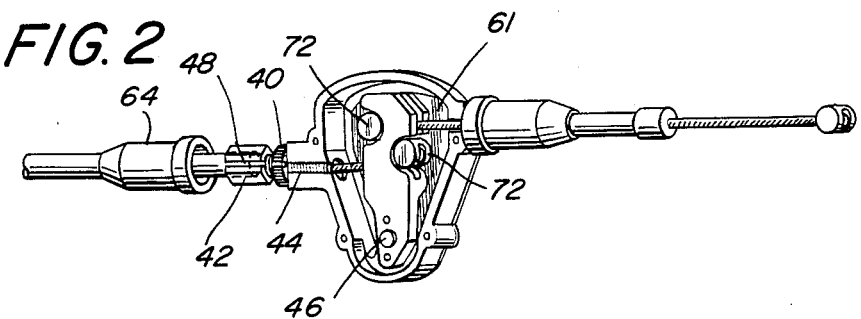
FIG. 2 shows the invention with front cover 60 removed and with protective rubber boot 64 displaced to the left so as to uncover cable adjuster 42.

Referring to FIG. 2; lever means 20 is pivotally attached to support for pivot pin 8 with pivot pin 46 which is inserted into one of the three sets of pivot pin aperture in lever means 22 and matching pivot pin aperture in holder means 10. Lever means 20 is free to rotate about pivot pin 46 with its range of travel being restricted only by the sides of housing means 2. One cable adjuster 42 is installed into each threaded hole 7 by engaging cable adjuster threaded end 44. The slots 48 in cable adjusters 42 are aligned with cable entry slots 6 and 12. Cables 70 and 71 are inserted laterally through entry slots 12 and 6 respectively and then through slots 48 in cable adjusters 42 and lock nuts 40. The interior of both cable adjusters 42 contain a clearance hole for cables 70 and 71.

Referring to FIG. 1; cable sleeves 66 and 67 are free to slide along cables 70 and 71 respectively. Cable sleeves 66, 67 have sleeve terminals 68 fixedly mounted at each of their ends. The cable clearance hole in cable adjuster 42 is enlarged at the hexnut end to accept sleeve terminal 68, i.e., sleeve terminal 68 is inserted into the hexnut end of cable adjuster 42. See FIG. 2. Rubber boots 64 are placed over cable adjusters 42 and the protruding cable entry slots 6 and 12. Front and rear covers 60 and 61 are attached to housing means 2 with four machine screws 62 each, which are engaged into tapped through holes 4. Cable end piece 73 is a small metal ball, one of which is soldered to each end of cables 70 and 71 and acts to capture cable terminal 72.

OPERATION OF THE INVENTION

Installation

The clutch cable system of a motorcycle consists of three components: an actuation handle mounted onto the motorcycle's handlebars, an interconnecting cable and a clutch mechanism mounted within the motorcycle's frame.

To install the invention, the motorcycle's interconnecting cable is disconnected from the actuation handle and inserted instead into cable entry slot 24 in lever means 20 as shown in FIG. 4. The motorcycle's interconnecting cable functions as output cable 71. Next, input cable 70 is inserted into cable entry slot 24 in lever means 20 as shown in FIG. 4. Lever means 20 with cables 70 and 71 is installed into housing means 2 with pivot pin 46. Cable adjusters 42 are inserted into threaded holes 7 and then cables 70 and 71 are inserted into slots 48 in cable adjusters 42. Cable sleeves 66 and 67 are inserted into the ends of cable adjusters 42 and are tensioned by appropriate thread engagement between cable adjusters 42 and threaded holes 7. Once cable sleeves 66 and 67 are tensioned so that no slack exists, lock nuts 40, which are threaded onto cable adjuster threaded ends 44, are tightened against housing means 2 to prevent loosening during motorcycle operation. Finally, front and rear covers 60 and 61 are installed with machine screws 62, and rubber boots 64 are slid over cable adjusters 42 to help exclude dust and moisture from the interior of housing means 2.

Operation

In the preferred embodiment, the invention acts to reduce the manual force required at the clutch actuation handle mounted on the motorcycle handlebars. In this application the actuation handle disengages the clutch when it is squeezed. Before being actuated, lever means 20 is in its nominal position, i.e., at the left side of housing means 2. When the clutch actuation handle is squeezed by the rider's hand, input cable 70 is pulled and, in turn, pulls lever means 20, which rotates, pivoting at pivot pin 46 and moves toward the right side of housing means 2. At the same time, lever means 20 pulls on output cable 71 which therefore moves to the right also and actuates the remotely located clutch mechanism. When the rider releases the clutch actuation handle a return spring located at the clutch mechanism pulls the entire linkage system back to its original unactuated position.

Because the pivot arm from pivot pin 46 to the center of input cable 70 is longer than the pivot arm from pivot pin 46 to the center of output cable 71 the preferred embodiment provides a mechanical advantage or force amplification. The invention enables the motorcycle rider to actuate the clutch with less manual effort applied to the clutch lever means than would be required if the invention were not present. Because the invention shortens the throw distance, the rider must squeeze the clutch actuation handle further to achieve a desired level of clutch disengagement.

In the preferred embodiment the mechanical advantage obtained depends upon which of the three apertures 10, 22 is selected. The bottom aperture provides the least mechanical advantage, while the top aperture provides the greatest. No matter which aperture is selected the relative position of lever means 20, with respect to housing means 2, does not change and cables 70 and 71 remain centered within cable adjusters 42.

CONCLUSION, RAMIFICATIONS AND SCOPE OF THE INVENTION

The invention provides a compact, rugged, and easily installed means for adjustably changing the mechanical characteristics of a linkage system without modifying the linkage system itself. While the above description contains many specificities, these should not be construed as limitations on the scope of the invention, but rather as an exemplification of one preferred embodiment thereof. Many other variations are possible. For instance the invention may be built much more ruggedly to meet the requirements of heavy duty linkage systems. Conversely, it may be built in miniature version to apply to tiny systems. It may be built with only one pivot point, or with more than three. Cable types and attachment methods may be modified to accept different styles of cable or other linkage components such as chains or bars. The length of lever means 20 and placement of pivot apertures may be changed to achieve any mechanical advantage ratio or throw distance ratio desired. More than one output cable may be attached to the lever means. This configuration allows the invention to act on two acutation devices simultaneously. The two output forces may both be step-up, or may both be step-down, or one may be step-up while the other is step-down. In the later case, the step-down cable is attached to the lever means so that its pivot arm is greater than that of the input cable.

Accordingly, the scope of the invention should be determined not by the embodiment illustrated, but by the appended claims and their legal equivalents.

What is claimed is:

1. The combination of a housing means rigidly anchoring the ends of two hollow cable sleeves, said cable sleeves being parallel and laterally offset from each other and lying in a plane wherein said housing means comprises a rigid structure containing a pivot pin aperture laterally offset from said cable sleeves; and a lever means comprising a first anchoring means for one end of an input cable and a second anchoring means for one end of an output cable, said cables being mounted in, and free to move longitudinally within said cable sleeves, and said lever means comprising a rigid structure containing a pivot pin aperture offset from said anchoring means wherein said input cable provides a longitudinal input force while said output cable is imparted a longitudinal output force, said force being transferred from said input cable to said output cable by said lever means; and a pivot pin means joining said lever means to said housing means such that said lever means lies in said plane and is nominally oriented in such a manner that the longitudinal axis of said lever means lies approximately transverse to said cables; whereby said input force results in said output force where said output force is larger than said input force; and whereby said cable sleeves transfer the natural reactive force in the opposite direction as that applied to said cables, providing stability to said housing means.

2. The invention defined in claim 1, wherein the outside physical dimensions of said housing means are approximately two inches square by one-half inch thick and wherein total weight of the invention is approximately three ounces and wherein said input cable is approximately five inches long; whereby the invention has the advantage of being small and lightweight enough to successfully fit and function in existing machines.

3. The invention defined in claim 1, wherein said housing means contains cable entry slots providing clearance for said input and output cables to be laterally inserted into said housing means and said lever means contains a cable entry slot providing clearance for said input and output cables to be laterally inserted into said lever means and said lever means contains two said anchoring means for said input and output cables; whereby said invention has the advantage that all parts can be assembled quickly and installed without tools.

4. The invention defined in claim 1, wherein at least two said pivot pin apertures are located in both said lever means and said housing means; whereby a change in force advantage ratio is made by changing the location of said pivot pin means from one said pivot pin aperture to another.

* * * * *